(12) United States Patent
Kim et al.

(10) Patent No.: US 10,748,032 B1
(45) Date of Patent: Aug. 18, 2020

(54) METHOD FOR PROVIDING ROBUST OBJECT DISTANCE ESTIMATION BASED ON CAMERA BY PERFORMING PITCH CALIBRATION OF CAMERA MORE PRECISELY WITH FUSION OF INFORMATION ACQUIRED THROUGH CAMERA AND INFORMATION ACQUIRED THROUGH V2V COMMUNICATION AND DEVICE USING THE SAME

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/724,617

(22) Filed: Dec. 23, 2019

Related U.S. Application Data

(63) Continuation of application No. 62/799,238, filed on Jan. 31, 2019.

(51) Int. Cl.
*G06K 9/62* (2006.01)
*H04N 5/20* (2006.01)
(Continued)

(52) U.S. Cl.
CPC ....... *G06K 9/6215* (2013.01); *G06K 9/00791* (2013.01); *G06K 9/036* (2013.01);
(Continued)

(58) Field of Classification Search
CPC .. G06K 9/6215; G06K 9/00791; G06K 9/036; G06K 9/2054; G06K 9/6232;
(Continued)

(56) References Cited

U.S. PATENT DOCUMENTS

| 10,202,077 B2 * | 2/2019 | Gupta | H04N 17/00 |
| 2018/0365858 A1 | 12/2018 | Kim et al. | |
| 2020/0064843 A1 * | 2/2020 | Shashua | G01C 21/3476 |

FOREIGN PATENT DOCUMENTS

| CN | 107390205 A | 11/2017 |
| EP | 3159828 A1 | 4/2017 |

* cited by examiner

*Primary Examiner* — Tsion B Owens
(74) *Attorney, Agent, or Firm* — Husch Blackwell LLP

(57) ABSTRACT

A method for enhancing an accuracy of object distance estimation based on a subject camera by performing pitch calibration of the subject camera more precisely with additional information acquired through V2V communication is provided. And the method includes steps of: (a) a computing device, performing (i) a process of instructing an initial pitch calibration module to apply a pitch calculation operation to the reference image, to thereby generate an initial estimated pitch, and (ii) a process of instructing an object detection network to apply a neural network operation to the reference image, to thereby generate reference object detection information; (b) the computing device instructing an adjusting pitch calibration module to (i) select a target object, (ii)
(Continued)

calculate an estimated target height of the target object, (iii) calculate an error corresponding to the initial estimated pitch, and (iv) determine an adjusted estimated pitch on the subject camera by using the error.

22 Claims, 4 Drawing Sheets

(51) Int. Cl.
*H04N 5/232* (2006.01)
*H04W 4/46* (2018.01)
*G06K 9/00* (2006.01)
*G06K 9/03* (2006.01)
*G06K 9/20* (2006.01)

(52) U.S. Cl.
CPC ......... *G06K 9/2054* (2013.01); *G06K 9/6232* (2013.01); *G06K 9/6256* (2013.01); *H04N 5/23206* (2013.01); *H04N 5/23218* (2018.08); *H04N 5/232127* (2018.08); *H04W 4/46* (2018.02)

(58) Field of Classification Search
CPC . G06K 9/6256; H04W 4/46; H04N 5/232127; H04N 5/23218
See application file for complete search history.

METHOD FOR PROVIDING ROBUST OBJECT DISTANCE ESTIMATION BASED ON CAMERA BY PERFORMING PITCH CALIBRATION OF CAMERA MORE PRECISELY WITH FUSION OF INFORMATION ACQUIRED THROUGH CAMERA AND INFORMATION ACQUIRED THROUGH V2V COMMUNICATION AND DEVICE USING THE SAME

CROSS REFERENCE OF RELATED APPLICATION

This present application claims the benefit of the earlier filing date of provisional patent application No. 62/799,238, filed Jan. 31, 2019, the entire contents of which being incorporated herein by reference.

FIELD OF THE DISCLOSURE

The present disclosure relates to a method and a device for use with an autonomous vehicle; and more particularly, to the method and the device for providing robust object distance estimation based on a camera.

BACKGROUND OF THE DISCLOSURE

The autonomous driving has recently attracted great attention as a future technology. Basically, the autonomous driving technology includes recognizing surrounding objects and estimating distances between an autonomous vehicle and the surrounding objects, etc. Through the processes, the autonomous driving technology allows the autonomous vehicle to drive safely, preventing the autonomous vehicle from colliding with the surrounding objects.

The conventional autonomous driving technology includes a process of finding a vanishing point on an input image, which is obtained through a camera. Then, pitch calibration is performed through calculating an angle between a normal vector corresponding to lens surface of the camera and the ground by using relationship between the vanishing point and a principal point on the input image. Thereafter, by using the calculated angle, at least one distance between at least one object on the input image and the autonomous vehicle may be calculated.

Meanwhile, there are some problems in the conventional autonomous technology. For example, an accuracy of the distance calculation decreases sharply when a quality of the input image acquired through the camera is not good enough. Since the distance estimation is performed based on the input image, it may be natural that flaws in the images incur flaws in the distance estimation. However, the real problem is that, in most of cases, it is impossible for people to prevent the flaws in the images. Specifically, the problems such as diminishing lights in a tunnel or a blurred view incurred by rainy weather cannot be solved even if people use superior cameras or design the autonomous driving system well.

Therefore, there is a need for providing accurate calculations of the distances even when the quality of the input image acquired through the camera is not good enough.

SUMMARY OF THE DISCLOSURE

It is an object of the present disclosure to solve all the aforementioned problems.

It is another object of the present disclosure to estimate distances between autonomous vehicles and surrounding objects even when a quality of an input image acquired through at least one camera is not good enough, by performing pitch calibration of the camera more precisely with additional information acquired through Vehicle-to-Vehicle (V2V) communication.

In accordance with one aspect of the present disclosure, there is provided a method for enhancing an accuracy of object distance estimation based on at least one subject camera by performing pitch calibration of the subject camera more precisely with additional information acquired through Vehicle-to-Vehicle (V2V) communication, including steps of: (a) a computing device, if at least one reference image is acquired through the subject camera, performing (i) a process of instructing an initial pitch calibration module to apply at least one pitch calculation operation to the reference image, to thereby generate an initial estimated pitch, which is a value generated by estimating an angle between an optical axis of the subject camera and a ground, and (ii) a process of instructing an object detection network to apply at least one neural network operation to the reference image, to thereby generate reference object detection information on one or more reference objects in the reference image; (b) the computing device instructing an adjusting pitch calibration module to (i) select at least one target object among the reference objects, (ii) calculate at least one estimated target height of the target object by referring to the initial estimated pitch and at least one relative location of the target object from a subject autonomous vehicle including the subject camera, (iii) calculate at least one error corresponding to the initial estimated pitch by referring to the estimated target height and at least one Ground-Truth (GT) target height acquired beforehand, and (iv) determine at least one adjusted estimated pitch on the subject camera by using the error.

As one example, the computing device instructs the adjusting pitch calibration module to select one or more specific reference objects, among the reference objects, which satisfy a first condition on whether each of the reference objects has a specific class corresponding to a communicability or not, and to select said at least one target object, among the specific reference objects, which satisfies at least one of (i) a second condition on whether each of specific reference bounding boxes including each of the specific reference objects is located in at least one illustration window area of the reference image or not and (ii) a third condition on whether an aspect ratio of each of the specific reference bounding box is smaller than an estimation threshold value or not.

As one example, before the step of (b), the computing device instructs a distance calculation module to map each of one or more reference location base points, which are points in each of lower sides of each of reference bounding boxes including each of the reference objects, onto a space coordinate system corresponding to a virtual space including the subject autonomous vehicle by referring to the initial estimated pitch, the reference object detection information and the reference image, to thereby calculate one or more longitudinal floor distances and one or more lateral floor distances between the reference objects and the subject autonomous vehicle, and then to thereby generate each of reference relative coordinates including each of the longitudinal floor distances and the lateral floor distances as its components.

As one example, before the step of (b), the computing device instructs the distance calculation module to map the reference location base points onto the space coordinate system by referring to a following formula:

$$(x_1, y_1) \to (X_1, Z_1), \text{ where } Z_1 = \frac{L}{\tan(\emptyset_1 + \theta)},$$

$$\emptyset_1 = \tan^{-1}\frac{y_1 - c_y}{f} \text{ and } X_1 = \frac{x - c_x}{f}Z_1$$

wherein $(x_1, y_1)$ denotes a coordinate of one of the reference location base points on the reference image, $(X_1, Z_1)$ denotes one of the reference relative coordinates corresponding to $(x_1, y_1)$ in the space coordinate system whose original point is set by using a location of the subject autonomous vehicle, $X_1$ denotes one of the lateral floor distances, $Z_1$ denotes one of the longitudinal floor distances, $\theta$ denotes the initial estimated pitch, $(c_x, c_y)$ denotes a coordinate of a principal point of the subject camera, L denotes a height of the subject camera from the ground, and f denotes a focal length of the subject camera.

As one example, before the step of (b), the computing device instructs a V2V communication module to communicate with one or more communicable objects located closer than a threshold distance from the subject autonomous vehicle, to thereby acquire information on one or more communicable object classes, one or more communicable object GT heights, and one or more communicable object coordinates, and instructs the adjusting pitch calibration module to select specific reference objects, among the reference objects, which have a specific class corresponding to a communicability, and pair at least part of the communicable object GT heights with at least part of the specific reference objects by referring to (i) communicable object relative coordinates in relation to the subject autonomous vehicle, calculated by using the communicable object coordinates and (ii) specific reference relative coordinates on the specific reference objects, to thereby acquire specific reference GT heights on the specific reference objects.

As one example, at the step of (b), the computing device, if the target object is selected, instructs the adjusting pitch calibration module to select a target relative coordinate corresponding to the target object, among the reference relative coordinates, and to calculate the estimated target height by performing a height estimating operation by referring to the initial estimated pitch, wherein the height estimating operation is performed by referring to a following formula:

$$H = \frac{(Z_2 - Z_1)}{Z_2}L, \text{ where } Z_2 = \frac{L}{\tan(\emptyset_2 + \theta)}, \emptyset_2 = \tan^{-1}\frac{y_2 - c_y}{f}$$

wherein $Z_1$ denotes a longitudinal floor distance of the target relative coordinate $(X_1, Z_1)$, $\theta$ denotes the initial estimated pitch, L denotes a height of the subject camera from the ground, $Z_2$ denotes a longitudinal projection distance, which is a component of a target height estimated point generated by mapping a target height estimation base point $(x_2, y_2)$, which is a point of an upper side of a target bounding box including the target object, onto a space coordinate system corresponding to a virtual space including the subject autonomous vehicle, and f denotes a focal length of the subject camera.

As one example, at the step of (b), the computing device, in case the number of the target object is 1, instructs the adjusting pitch calibration module (i) to set an overestimated range and an underestimated range by referring to the GT target height, and (ii-1) to adjust the initial estimated pitch to be decreased by a prescribed adjustment ratio if the estimated target height is included in the overestimated range, or (ii-2) to adjust the initial estimated pitch to be increased by the prescribed adjustment ratio if the estimated target height is included in the underestimated range.

As one example, at the step of (b), the computing device, in case the number of the target object is larger than or same as 2, instructs the adjusting pitch calibration module (i) to set an overestimated range and an underestimated range by referring to the GT target height, (ii) to acquire information on at least one of an overestimated error ratio corresponding to the overestimated range and an underestimated error ratio corresponding to the underestimated range, and (iii) adjust the initial estimated pitch by referring to said information.

As one example, at the step of (a), the computing device instructs the initial pitch calibration module to generate the initial estimated pitch by applying the pitch calculation operation to the reference image, wherein the pitch calculation operation is performed by referring to a following formula:

$$\theta_{pitch} = \tan^{-1}\left(\frac{v_y - c_y}{f_y}\right)$$

wherein $v_y$ denotes an y-direction coordinate of a vanishing point of the reference image, whose information has been acquired by finding a point where one or more lines of the reference image vanish, $c_y$ denotes an y-direction coordinate of a principal point of the reference image, and $f_y$ denotes an y-direction coordinate of a focal point of the reference image.

As one example, at the step of (a), the computing device (i) instructs a convolutional layer of the object detection network to generate at least one reference convolutional feature map by applying at least one convolutional operation, which is a part of the neural network operation, to the reference image, (ii) instructs an ROI pooling layer of the object detection network to apply at least one pooling operation, which is a part of the neural network operation, in order to pool values, corresponding to ROIs of the reference image, from the reference convolutional feature map, to thereby generate at least one reference ROI-Pooled feature map, and (iii) instructs an FC layer of the object detection network to apply at least one FC operation, which is a part of the neural network operation, to the reference ROI-Pooled feature map, to thereby generate the reference object detection information including information on reference classes of the reference objects and reference bounding boxes including the reference objects.

As one example, the method further comprises a step of: (c) the computing device instructing the object detection network and the distance calculation module to generate autonomous driving information including information on distances, calculated by referring to the adjusted estimated pitch, between the subject autonomous vehicle and surrounding objects included in an autonomous driving image.

In accordance with another aspect of the present disclosure, there is provided a computing device for enhancing an accuracy of object distance estimation based on at least one subject camera by performing pitch calibration of the subject camera more precisely with additional information acquired through Vehicle-to-Vehicle (V2V) communication, including: at least one memory that stores instructions; and at least one processor configured to execute the instructions to perform processes of: (I) if at least one reference image is acquired through the subject camera, performing (i) a process of instructing an initial pitch calibration module to apply at least one pitch calculation operation to the reference image, to thereby generate an initial estimated pitch, which is a value generated by estimating an angle between an optical axis of the subject camera and a ground, and (ii) a process of instructing an object detection network to apply at least one neural network operation to the reference image, to thereby generate reference object detection information on one or more reference objects in the reference image; (II) instructing an adjusting pitch calibration module to (i) select at least one target object among the reference objects, (ii) calculate at least one estimated target height of the target object by referring to the initial estimated pitch and at least one relative location of the target object from a subject autonomous vehicle including the subject camera, (iii) calculate at least one error corresponding to the initial estimated pitch by referring to the estimated target height and at least one Ground-Truth (GT) target height acquired beforehand, and (iv) determine at least one adjusted estimated pitch on the subject camera by using the error.

As one example, the processor instructs the adjusting pitch calibration module to select one or more specific reference objects, among the reference objects, which satisfy a first condition on whether each of the reference objects has a specific class corresponding to a communicability or not, and to select said at least one target object, among the specific reference objects, which satisfies at least one of (i) a second condition on whether each of specific reference bounding boxes including each of the specific reference objects is located in at least one illustration window area of the reference image or not and (ii) a third condition on whether an aspect ratio of each of the specific reference bounding box is smaller than an estimation threshold value or not.

As one example, before the process of (II), the processor instructs a distance calculation module to map each of one or more reference location base points, which are points in each of lower sides of each of reference bounding boxes including each of the reference objects, onto a space coordinate system corresponding to a virtual space including the subject autonomous vehicle by referring to the initial estimated pitch, the reference object detection information, and the reference image, to thereby calculate one or more longitudinal floor distances and one or more lateral floor distances between the reference objects and the subject autonomous vehicle, and then to thereby generate each of reference relative coordinates including each of the longitudinal floor distances and the lateral floor distances as its components.

As one example, before the process of (II), the processor instructs the distance calculation module to map the reference location base points onto the space coordinate system by referring to a following formula:

$$(x_1, y_1) \rightarrow (X_1, Z_1), \text{ where } Z_1 = \frac{L}{\tan(\phi_1 + \theta)},$$

$$\phi_1 = \tan^{-1} \frac{y_1 - c_y}{f} \text{ and } X_1 = \frac{x - c_x}{f} Z_1$$

wherein $(x_1, y_1)$ denotes a coordinate of one of the reference location base points on the reference image, $(X_1,$ $Z_1)$ denotes one of the reference relative coordinates corresponding to $(x_1, y_1)$ in the space coordinate system whose original point is set by using a location of the subject autonomous vehicle, $X_1$ denotes one of the lateral floor distances, $Z_1$ denotes one of the longitudinal floor distances, $\theta$ denotes the initial estimated pitch, $(c_x, c_y)$ denotes a coordinate of a principal point of the subject camera, L denotes a height of the subject camera from the ground, and f denotes a focal length of the subject camera.

As one example, before the process of (II), the processor instructs a V2V communication module to communicate with one or more communicable objects located closer than a threshold distance from the subject autonomous vehicle, to thereby acquire information on one or more communicable object classes, one or more communicable object GT heights, and one or more communicable object coordinates, and instructs the adjusting pitch calibration module to select specific reference objects, among the reference objects, which have a specific class corresponding to a communicability, and pair at least part of the communicable object GT heights with at least part of the specific reference objects by referring to (i) communicable object relative coordinates in relation to the subject autonomous vehicle, calculated by using the communicable object coordinates and (ii) specific reference relative coordinates on the specific reference objects, to thereby acquire specific reference GT heights on the specific reference objects.

As one example, at the process of (II), the processor, if the target object is selected, instructs the adjusting pitch calibration module to select a target relative coordinate corresponding to the target object, among the reference relative coordinates, and to calculate the estimated target height by performing a height estimating operation by referring to the initial estimated pitch, wherein the height estimating operation is performed by referring to a following formula:

$$H = \frac{(Z_2 - Z_1)}{Z_2} L, \text{ where } Z_2 = \frac{L}{\tan(\phi_2 + \theta)}, \phi_2 = \tan^{-1} \frac{y_2 - c_y}{f}$$

wherein $Z_1$ denotes a longitudinal floor distance of the target relative coordinate $(X_1, Z_1)$, $\theta$ denotes the initial estimated pitch, L denotes a height of the subject camera from the ground, $Z_2$ denotes a longitudinal projection distance, which is a component of a target height estimated point generated by mapping a target height estimation base point $(x_2, y_2)$, which is a point of an upper side of a target bounding box including the target object, onto a space coordinate system corresponding to a virtual space including the subject autonomous vehicle, and f denotes a focal length of the subject camera.

As one example, at the process of (II), the processor, in case the number of the target object is 1, instructs the adjusting pitch calibration module (i) to set an overestimated range and an underestimated range by referring to the GT target height, and (ii-1) to adjust the initial estimated pitch to be decreased by a prescribed adjustment ratio if the estimated target height is included in the overestimated range, or (ii-2) to adjust the initial estimated pitch to be increased by the prescribed adjustment ratio if the estimated target height is included in the underestimated range.

As one example, at the process of (II), the processor, in case the number of the target object is larger than or same as 2, instructs the adjusting pitch calibration module (i) to set an overestimated range and an underestimated range by referring to the GT target height, (ii) to acquire information on at least one of an overestimated error ratio corresponding to the overestimated range and an underestimated error ratio corresponding to the underestimated range, and (iii) adjust the initial estimated pitch by referring to said information.

As one example, at the process of (I), the processor instructs the initial pitch calibration module to generate the initial estimated pitch by applying the pitch calculation operation to the reference image, wherein the pitch calculation operation is performed by referring to a following formula:

$$\theta_{pitch} = \tan^{-1}\left(\frac{v_y - c_y}{f_y}\right)$$

wherein $v_y$ denotes an y-direction coordinate of a vanishing point of the reference image, whose information has been acquired by finding a point where one or more lines of the reference image vanish, $c_y$ denotes an y-direction coordinate of a principal point of the reference image, and $f_y$ denotes an y-direction coordinate of a focal point of the reference image.

As one example, at the process of (I), the processor (i) instructs a convolutional layer of the object detection network to generate at least one reference convolutional feature map by applying at least one convolutional operation, which is a part of the neural network operation, to the reference image, (ii) instructs an ROI pooling layer of the object detection network to apply at least one pooling operation, which is a part of the neural network operation, in order to pool values, corresponding to ROIs of the reference image, from the reference convolutional feature map, to thereby generate at least one reference ROI-Pooled feature map, and (iii) instructs an FC layer of the object detection network to apply at least one FC operation, which is a part of the neural network operation, to the reference ROI-Pooled feature map, to thereby generate the reference object detection information including information on reference classes of the reference objects and reference bounding boxes including the reference objects.

As one example, the processor further performs a process of: (III) instructing the object detection network and the distance calculation module to generate autonomous driving information including information on distances, calculated by referring to the adjusted estimated pitch, between the subject autonomous vehicle and surrounding objects included in an autonomous driving image.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
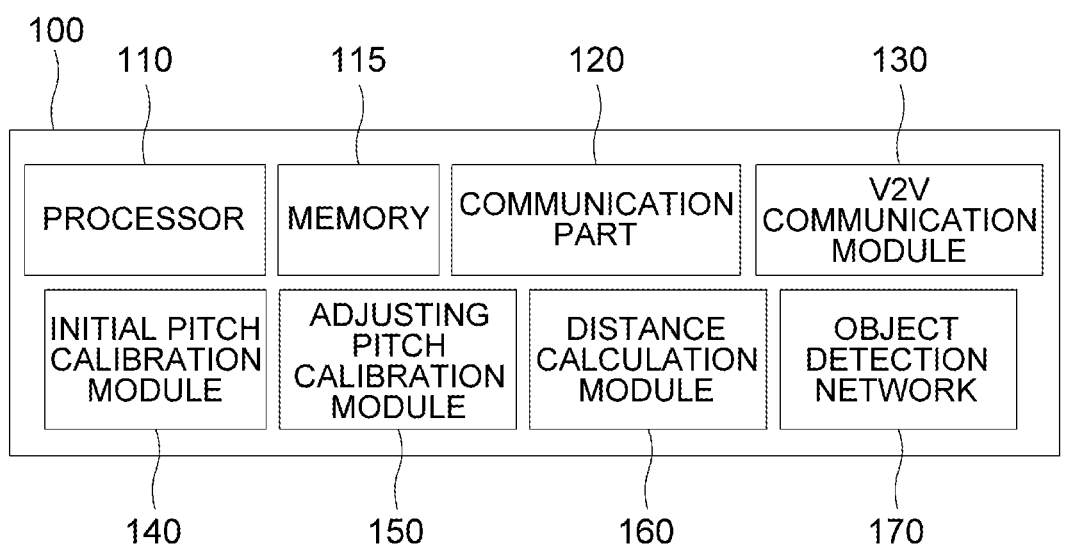
FIG. 1 is a drawing schematically illustrating a configuration of a computing device performing pitch calibration more precisely with additional information acquired through Vehicle-to-Vehicle (V2V) communication in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

FIG. 1 is a drawing schematically illustrating a configuration of a computing device 100 performing a method for performing pitch calibration more precisely with additional information acquired through Vehicle-to-Vehicle (V2V) communication in accordance with one example embodiment of the present disclosure.

By referring to FIG. 1, the computing device 100 may include at least one V2V communication module 130, at least one initial pitch calibration module 140, at least one adjusting pitch calibration module 150, at least one distance calculation module 160 and at least one object detection network 170. Processes of input/output and computation of the V2V communication module 130, the initial pitch calibration module 140, the adjusting pitch calibration module 150, the distance calculation module 160 and the object detection network 170 may be respectively performed by at least one communication part 120 and at least one processor 110. However, detailed communication schematics between the communication part 120 and the processor 110 are omitted in FIG. 1. Herein, a memory 115 may have stored various instructions to be described later, and the processor 110 may execute the instructions stored in the memory 115 and may perform processes of the present disclosure by executing the instructions to be disclosed later. Such description of the computing device 100 does not exclude an integrated device including any combination of a processor, a memory, a medium, or any other computing components.

In the present disclosure, the computing device 100 may perform in correlation with a subject autonomous vehicle including a subject camera, to be calibrated by using a method of the present disclosure. In this case, the computing device 100 may be installed to the subject autonomous vehicle, or may be installed to a center server which communicates with the subject autonomous vehicle.

The configuration of the computing device 100 performing the pitch calibration more precisely with the additional information acquired through the V2V communication in accordance with one example embodiment of the present disclosure has been explained above. Hereinafter, detailed explanation on a method for the object distance estimation based on the subject camera in accordance with the present disclosure will be made by referring to FIG. 2.

Figure 2:
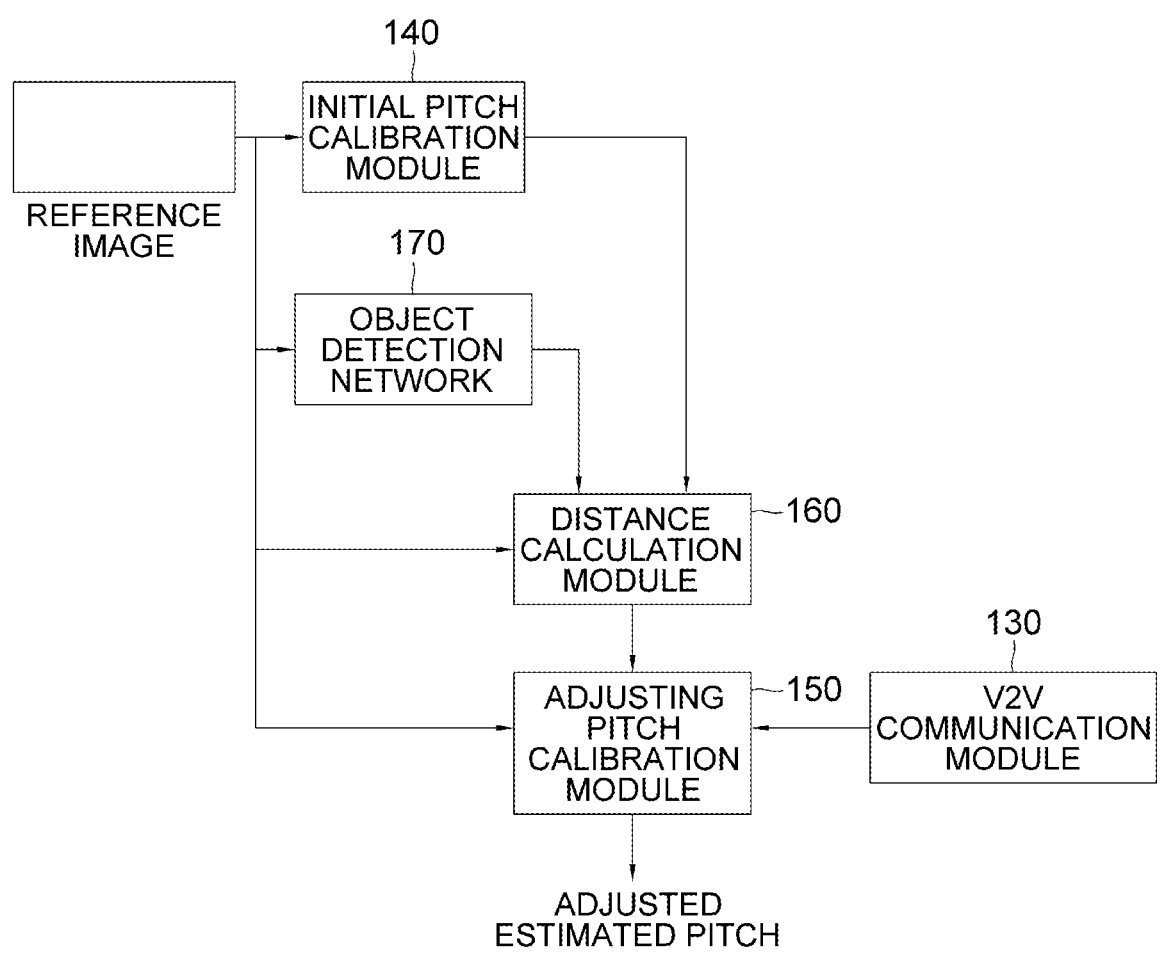
FIG. 2 is a flow chart schematically illustrating a method for performing pitch calibration more precisely with additional information acquired through Vehicle-to-Vehicle (V2V) communication in accordance with one example embodiment of the present disclosure.

FIG. 2 is a flow chart schematically illustrating the method for performing pitch calibration more precisely with additional information acquired through V2V communication in accordance with one example embodiment of the present disclosure.

By referring to the FIG. 2, if a reference image is obtained through the subject camera, respective computations of the initial pitch calibration module 140 and the object detection network 170 may be performed. Then, respective results of the computations, i.e., an initial estimated pitch from the initial pitch calibration module 140 and reference object detection information from the object detection network 170, and the reference image may be independently inputted into the distance calculation module 160 to thereby estimate one or more reference relative coordinates of one or more reference objects included in the reference image in relation to the subject autonomous vehicle. In parallel with this process, the V2V communication module 130 of the computing device 100 may obtain information on communicable objects located closer than a threshold distance, by communicating with the communicable objects via the V2V communication. Then, information on such reference coordinates and information on the communicable objects may be transferred to the adjusting pitch calibration module 150. Thereafter, an adjusted estimated pitch for the subject camera may be calculated through computations of the adjusting pitch calibration module 150. Finally, an accurate distance between the autonomous vehicle and surrounding objects may be calculated more precisely.

More specifically, the computing device 100 may instruct the initial pitch calibration module 140 to calculate the initial estimated pitch, which is an angle between an optical axis of the subject camera and a ground, by using the reference image acquired through the subject camera. Such a process may be performed in accordance with the conventional technology using relationships among a vanishing point, a principal point and a focal point on the reference image. Detailed explanation on this process will be made by referring to FIG. 3.

Figure 3:
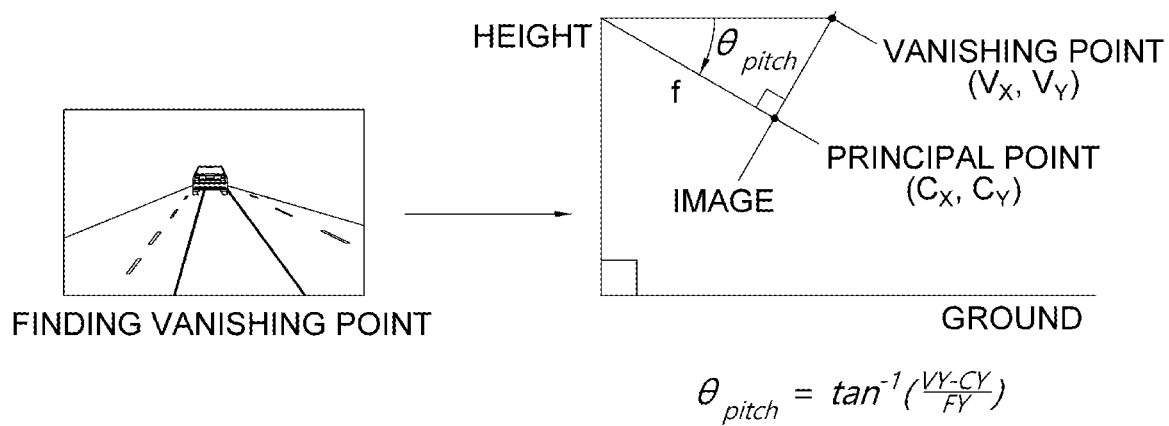
FIG. 3 is a drawing schematically illustrating a method for calculating an initial estimated pitch to be used for performing pitch calibration more precisely with additional information acquired through Vehicle-to-Vehicle (V2V) communication in accordance with one example embodiment of the present disclosure.

FIG. 3 is a drawing schematically illustrating a method for calculating the initial estimated pitch to be used for performing pitch calibration more precisely with additional information acquired through Vehicle-to-Vehicle (V2V) communication in accordance with one example embodiment of the present disclosure.

By referring to FIG. 3, principles for calculating the initial estimated pitch may be shown. Since the vanishing point ($v_x$, $v_y$) is a point that is not changed by horizontal movement of the subject camera, but changed by rotational movement of the subject camera, the initial estimated pitch of the subject camera can be calculated by using information on locations of the vanishing point, the focal point and the principal point on the reference image.

Specifically, the computing device 100 may allow the initial pitch calibration module 140 to detect a coordinate of the vanishing point, which is a point where lines on the reference image converge. Thereafter, the computing device 100 may allow the initial pitch calibration module 140 to calculate the initial estimated pitch by using information on coordinates of the vanishing point, the focal point and the principal point which has been acquired before. For example, in case a coordinate of the vanishing point is ($v_x$, $v_y$), a coordinate of the focal point is ($f_x$, $f_y$) and a coordinate of the principal point is ($c_x$, $c_y$), the initial estimated pitch can be calculated as follows:

$$\theta_{pitch} = \tan^{-1}\left(\frac{vy - cy}{fy}\right)$$

In parallel with this calculation, the reference image acquired through the subject camera may be transferred to the object detection network 170. The object detection network 170 may apply at least one neural network operation to the reference image, to thereby detect the reference objects on the reference image, and then to thereby generate the reference object detection information including information on the reference objects. Herein, the object detection network 170 may be assisted by corresponding RPN, i.e., region proposal network.

Specifically, the computing device 100 may instruct a convolutional layer of the object detection network 170 to generate at least one reference convolutional feature map by applying at least one convolutional operation, which is a part of the neural network operation, to the reference image, and may instruct an ROI pooling layer of the object detection network 170 to apply at least one pooling operation, which is a part of the neural network operation, in order to pool values, corresponding to ROIs of the reference image, from the reference convolutional feature map, to thereby generate at least one reference ROI-Pooled feature map. Thereafter, the computing device 100 may instruct an FC layer of the object detection network 170 to apply at least one FC operation, which is a part of the neural network operation, to the reference ROI-Pooled feature map, to thereby generate the reference object detection information including information on reference classes of the reference objects and reference bounding boxes including the reference objects.

If the initial estimated pitch is calculated by the initial pitch calibration module 140, and the reference object detection information is generated by the object detection network 170, they are transferred to the distance calculation module 160. Thereafter, the computing device 100 may instruct the distance calculation module 160 to calculate the reference relative coordinates by calculating each of one or more longitudinal floor distances and each of one or more lateral floor distances between each of the reference objects and the subject autonomous vehicle, by using the initial estimated pitch.

Specifically, the computing device 100 may instruct the distance calculation module 160 to find each of one or more reference location base points, which are points in each of lower sides of each of reference bounding boxes including each of the reference objects. Herein, the reference location base points may be points located in centers of said lower sides, but the scope of the present disclosure may not be limited thereto. Thereafter, the computing device 100 may instruct the distance calculation module 160 to map the reference location base points onto a space coordinate system corresponding to a virtual space including the subject autonomous vehicle. Processes of such mapping may be performed by referring to a following formula:

$$(x_1, y_1) \rightarrow (X_1, Z_1), \text{ where } Z_1 = \frac{L}{\tan(\emptyset_1 + \theta)},$$

$$\emptyset_1 = \tan^{-1}\frac{y_1 - c_y}{f} \text{ and } X_1 = \frac{x - c_x}{f}Z_1$$

In the formula, $(x_1, y_1)$ may denote a coordinate of one of the reference location base points on the reference image, and $(X_1, Z_1)$ may denote one of the reference relative coordinates corresponding to $(x_1, y_1)$ in the space coordinate system whose original point is set by using a location of the subject autonomous vehicle. Also, $X_1$ may denote one of the lateral floor distances, and $Z_1$ may denote one of the longitudinal floor distances. Further, $\theta$ may denote the initial estimated pitch, $(c_x, c_y)$ may denote a coordinate of a principal point of the subject camera, L may denote a height of the subject camera from the ground, and f may denote a focal length of the subject camera. By referring to FIG. 4, which will be explained specifically later, how $Z_1$ can be calculated by such formula can be shown. $\emptyset_1$ may represent an angle between the optical axis and a line connecting the subject camera and $(X_1, Z_1)$, and can be calculated by using said formula. Since $\emptyset_1$ and $\theta$ are known, $Z_1$ can be calculated by using a trigonometric function.

In parallel with this process, the computing device 100 may instruct the V2V communication module 130 to communicate with the communicable objects, including vehicles and motorcycles which are located closer than the threshold distance and are capable of the V2V communications with the subject autonomous vehicle. Herein, to establish the V2V communications, any conventional communication technologies such as 4G communication, 5G communication, or radio communication among vehicles can be used. Through such V2V communications, the V2V communication module 130 may acquire information on one or more communicable object classes, one or more communicable object GT heights, and one or more communicable object coordinates of the communicable objects. To be explained later, the communicable object GT heights can be used to adjust the initial estimated pitch.

Thereafter, the information on the communicable objects acquired through the V2V communication module 130, the reference relative coordinates calculated by the distance calculation module 160 and the reference object detection information generated by the object detection network 170 may be transferred to the adjusting pitch calibration module 150.

And, the computing device 100 may instruct the adjusting pitch calibration module 150 to pair at least part of the communicable object GT heights with at least part of the specific reference objects by referring to (i) communicable object relative coordinates in relation to the subject autonomous vehicle, calculated by using the communicable object coordinates and (ii) specific reference relative coordinates on the specific reference objects, to thereby acquire specific reference GT heights on the specific reference objects. Herein, the specific reference objects may be objects included in both of a group of the reference objects and a group of the communicable objects. More specifically, by comparing the communicable object relative coordinates and the reference relative coordinates, similarity scores between the communicable object relative coordinates and the reference relative coordinates can be calculated, and the specific reference objects and the communicable object GT heights can be paired, by finding specific similarity scores larger than a threshold and selecting the pairs corresponding to the specific similarity scores.

Meanwhile, the computing device 100 may instruct the adjusting pitch calibration module 150 to select at least one target object to be used for adjusting the initial estimated pitch. The target object may be at least one of the reference objects on the reference image, and it should satisfy a first condition on whether each of the reference objects has a specific class corresponding to a communicability. The first condition should be satisfied because a GT target height corresponding to the target object has to be acquired from said communicable object GT heights, which have been acquired through the V2V communication. Additionally, the target object may satisfy at least one of a second condition and a third condition. Herein, the second condition may correspond to a condition on whether each of specific reference bounding boxes, including each of specific reference objects which satisfies the first condition, is located in at least one illustration window area of the reference image or not. Also, the third condition may correspond to a condition on whether each of aspect ratios of each of the specific reference bounding box is smaller than an estimation threshold value or not.

In the second condition, the illustration window area is presented. If one of the specific reference bounding boxes is located in the illustration window area, a whole part of its corresponding object may be included in said one of the specific reference bounding boxes. On the contrary, if said one of the specific reference bounding boxes is not located in the illustration window area, only part of its corresponding object may be included in said one of the specific reference bounding boxes. To be simple, the illustration window area may be a center area of the reference image, far from boundaries of the reference image, where sides of the specific reference bounding boxes included therein do not border the boundaries of the reference image. If one of a specific reference object, whose corresponding specific reference bounding box is not located in the illustration window area, thus does not include the whole part of its corresponding specific reference object, is selected as the target object, it may cause errors on processes of adjusting the initial estimated pitch, thus the second condition is necessary.

In the third condition, the estimation threshold value is presented. The estimation threshold value is used for selecting one of the specific reference objects which is not too much laterally apart from the subject autonomous vehicle as the target object. If one of the specific reference objects is too much laterally apart from the subject autonomous vehicle, its corresponding specific reference bounding box may have large aspect ratio. Thus, by comparing aspect ratios of the specific reference bounding boxes to the estimation threshold value, some of the specific reference objects which are too much laterally apart from the subject autonomous vehicle can be excluded from being selected as the target object. The reason why said some of the specific reference objects should be excluded is because, if one of said some of the specific reference objects is selected as the target object, it may have been illustrated distortedly in the reference image, so that errors may be caused in the processes of adjusting the initial estimated pitch. Thus the second condition is necessary.

Thereafter, the computing device 100, if the target object is determined, may instruct the adjusting pitch calibration module 150 to acquire a target relative coordinate by selecting one corresponding to the target object among the reference relative coordinates, and to acquire a GT target height by selecting one corresponding to the target object among the specific reference GT heights. After such information on the target relative coordinate and the GT target height is acquired, the computing device 100 may instruct the adjusting pitch calibration module 150 to generate an estimated target height. The method for calculating the estimated target height of the target object will be explained hereafter.

Specifically, the estimated target height may be calculated by performing a height estimating operation corresponding to a following formula:

$$H = \frac{(Z_2 - Z_1)}{Z_2} L, \text{ where } Z_2 = \frac{L}{\tan(\emptyset_2 + \theta)}, \emptyset_2 = \tan^{-1}\frac{y_2 - c_y}{f}$$

In the formula, $Z_1$ may denote a longitudinal floor distance of the target relative coordinate $(X_1, Z_1)$, and $\theta$ may denote the initial estimated pitch. Also, L may denote a height of the subject camera from the ground, and $Z_2$ may denote a longitudinal projection distance, which is a component of a target height estimated point generated by mapping a target height estimation base point $(x_2, y_2)$, which is a point of an upper side of a target bounding box including the target object, onto a space coordinate system corresponding to a virtual space including the subject autonomous vehicle. And f may denote a focal length of the subject camera. Herein, processes of calculating $\emptyset_2$ and $Z_2$ are similar to those of calculating $\emptyset_1$ and $Z_1$ which were explained before. In order to explain the formula geometrically, FIG. 4 will be referred to.

Figure 4:
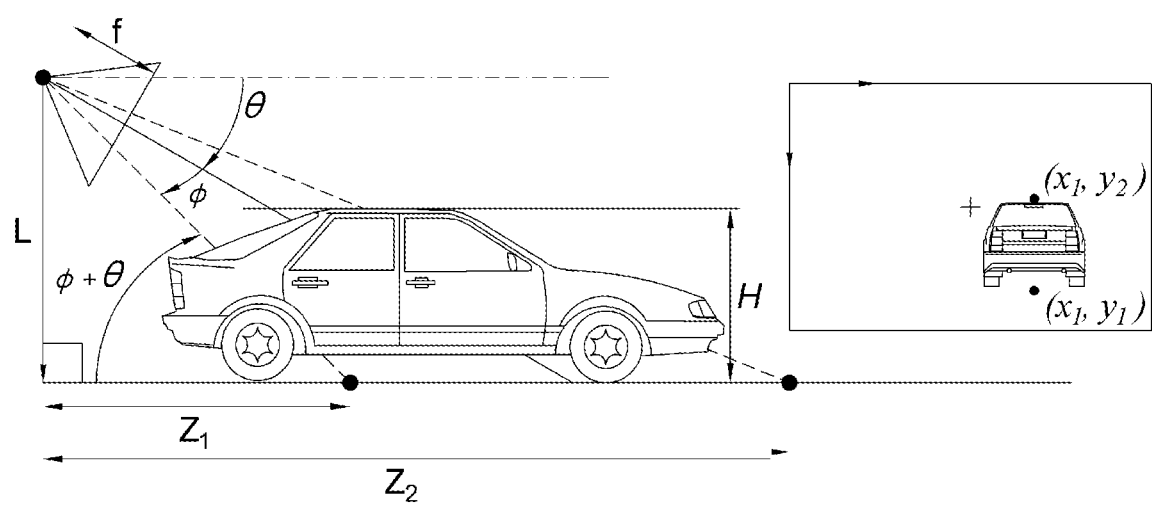
FIG. 4 is a drawing schematically illustrating a method for calculating an estimated target height of a target object to be used for performing pitch calibration more precisely with additional information acquired through Vehicle-to-Vehicle (V2V) communication in accordance with one example embodiment of the present disclosure.

FIG. 4 is a drawing schematically illustrating a method for calculating the estimated target height of the target object to be used for performing pitch calibration more precisely with additional information acquired through Vehicle-to-Vehicle (V2V) communication in accordance with one example embodiment of the present disclosure.

By referring to FIG. 4, it can be seen that a first right-angle triangle having $Z_2$ and L as its sides and a second right-angle triangle having, $Z_2-Z_1$ and H are AA similar. Thus, a formula representing a proportional relationship H:L=$Z_2$-$Z_1$:$Z_2$ holds, and by using such formula, the estimated target height H can be calculated.

After the estimated target height is calculated, the initial estimated pitch is adjusted. There are two different embodiments, one for a case that a single target object has been selected, and another one for a case that a plurality of target objects have been selected. Each of the embodiments will be explained below.

First, in case the number of the target object is 1, the computing device 100 may instruct the adjusting pitch calibration module 150 to set an overestimated range and an underestimated range by referring to the GT target height. Herein, the overestimated range may be a range of values R times smaller than the GT target height, and the underestimated range may be a range of values R times larger than the GT target height. The R may be a threshold ratio which has been predetermined. The overestimated range and the underestimated range are set as shown above because the estimated target height is calculated smaller than the GT target height in case the initial estimated pitch is calculated too large, and the estimated target height is calculated larger in the opposite case.

After the ranges are set as shown above, if the estimated target height is included in the overestimated range, the computing device 100 may instruct the adjusting pitch calibration module 150 to adjust the initial estimated pitch to be decreased by a prescribed adjustment ratio, to thereby generate the adjusted estimated pitch. Also, if the estimated target height is included in the underestimated range, the computing device 100 may instruct the adjusting pitch calibration module 150 to adjust the initial estimated pitch to be increased by the prescribed adjustment ratio, to thereby generate the adjusted estimated pitch.

Second, in case the number of the target object is larger than or same as 2, the computing device 100 may instruct the adjusting pitch calibration module 150 to set the overestimated range and the underestimated range as shown above, and to acquire information on at least one of an overestimated error ratio corresponding to the overestimated range and the underestimated error ratio corresponding to the underestimated range. Herein, the overestimated error ratio may be a ratio of (r1) the number of first specific target objects whose first specific estimated target heights are included in the overestimated range to (r2) the number of the target objects. Similarly, the underestimated error ratio may be a ratio of (r1) the number of second specific target objects whose second specific estimated target heights are included in the underestimated range to (r2) the number of the target objects. The computing device may instruct the adjusting pitch calibration module to adjust the initial estimated pitch if one of the underestimated error ratio and the overestimated error ratio is larger than a threshold.

Normally, if there is an error in the initial estimated pitch, only one of the underestimated error ratio and the overestimated error ratio will be larger than the threshold. If the underestimated error ratio is larger than the threshold, the computing device 100 may instruct the adjusting pitch calibration module 150 to adjust the initial estimated pitch to be increased by the prescribed adjustment ratio, to thereby generate the adjusted estimated pitch. On the contrary, if the overestimated error ratio is larger than the threshold, the computing device 100 may instruct the adjusting pitch calibration module 150 to adjust the initial estimated pitch to be decreased by the prescribed adjustment ratio, to thereby generate the adjusted estimated pitch.

The computing device 100, if the adjusted estimated pitch is determined, may instruct the distance calculation module 160 and the object detection network 170 to generate autonomous driving information including information on distances, calculated by referring to the adjusted estimated pitch, between the subject autonomous vehicle and surrounding objects included in an autonomous driving image.

The present disclosure is related to the method for adjusting camera pitch through the online calibration, via the V2V communication. That is, the present disclosure may provide robust object distance estimation based on the camera. Herein, the robust distance estimation may include processes of adjusting the camera pitch by searching the vanishing point, obtaining the actual height information of the surrounding vehicles by fusing information acquired through the V2V communication and information acquired through the camera, and adjusting the pitch more accurately by using the actual height information of the surrounding vehicles.

The present disclosure has an effect of estimating distances between the autonomous vehicles and the objects even when the quality of the images acquired through the camera is not good enough, by performing the pitch calibration more precisely with the additional information acquired through the Vehicle-to-Vehicle (V2V) communication.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for enhancing an accuracy of object distance estimation based on at least one subject camera by performing pitch calibration of the subject camera more precisely with additional information acquired through Vehicle-to-Vehicle (V2V) communication, comprising steps of:
   (a) a computing device, if at least one reference image is acquired through the subject camera, performing (i) a process of instructing an initial pitch calibration module to apply at least one pitch calculation operation to the reference image, to thereby generate an initial estimated pitch, which is a value generated by estimating an angle between an optical axis of the subject camera and a ground, and (ii) a process of instructing an object detection network to apply at least one neural network operation to the reference image, to thereby generate reference object detection information on one or more reference objects in the reference image;
   (b) the computing device instructing an adjusting pitch calibration module to (i) select at least one target object among the reference objects, (ii) calculate at least one estimated target height of the target object by referring to the initial estimated pitch and at least one relative location of the target object from a subject autonomous vehicle including the subject camera, (iii) calculate at least one error corresponding to the initial estimated pitch by referring to the estimated target height and at least one Ground-Truth (GT) target height acquired beforehand, and (iv) determine at least one adjusted estimated pitch on the subject camera by using the error.

2. The method of claim 1, wherein the computing device instructs the adjusting pitch calibration module to select one or more specific reference objects, among the reference objects, which satisfy a first condition on whether each of the reference objects has a specific class corresponding to a communicability or not, and to select said at least one target object, among the specific reference objects, which satisfies at least one of (i) a second condition on whether each of specific reference bounding boxes including each of the specific reference objects is located in at least one illustration window area of the reference image or not and (ii) a third condition on whether an aspect ratio of each of the specific reference bounding box is smaller than an estimation threshold value or not.

3. The method of claim 1, wherein, before the step of (b), the computing device instructs a distance calculation module to map each of one or more reference location base points, which are points in each of lower sides of each of reference bounding boxes including each of the reference objects, onto a space coordinate system corresponding to a virtual space including the subject autonomous vehicle by referring to the initial estimated pitch, the reference object detection information and the reference image, to thereby calculate one or more longitudinal floor distances and one or more lateral floor distances between the reference objects and the subject autonomous vehicle, and then to thereby generate each of reference relative coordinates including each of the longitudinal floor distances and the lateral floor distances as its components.

4. The method of claim 3, wherein, before the step of (b), the computing device instructs the distance calculation module to map the reference location base points onto the space coordinate system by referring to a following formula:

$$(x_1, y_1) \rightarrow (X_1, Z_1), \text{ where } Z_1 = \frac{L}{\tan(\phi_1 + \theta)},$$

$$\phi_1 = \tan^{-1}\frac{y_1 - c_y}{f} \text{ and } X_1 = \frac{x - c_x}{f}Z_1$$

wherein $(x_1, y_1)$ denotes a coordinate of one of the reference location base points on the reference image, $(X_1, Z_1)$ denotes one of the reference relative coordinates corresponding to $(x_1, y_1)$ in the space coordinate system whose original point is set by using a location of the subject autonomous vehicle, $X_1$ denotes one of the lateral floor distances, $Z_1$ denotes one of the longitudinal floor distances, $\theta$ denotes the initial estimated pitch, $(c_x, c_y)$ denotes a coordinate of a principal point of the subject camera, L denotes a height of the subject camera from the ground, and f denotes a focal length of the subject camera.

5. The method of claim 3, wherein, before the step of (b), the computing device instructs a V2V communication module to communicate with one or more communicable objects located closer than a threshold distance from the subject autonomous vehicle, to thereby acquire information on one or more communicable object classes, one or more communicable object GT heights, and one or more communicable object coordinates, and instructs the adjusting pitch calibration module to select specific reference objects, among the reference objects, which have a specific class corresponding to a communicability, and pair at least part of the communicable object GT heights with at least part of the specific reference objects by referring to (i) communicable object relative coordinates in relation to the subject autonomous vehicle, calculated by using the communicable object coordinates and (ii) specific reference relative coordinates on the specific reference objects, to thereby acquire specific reference GT heights on the specific reference objects.

6. The method of claim 1, wherein, at the step of (b), the computing device, if the target object is selected, instructs the adjusting pitch calibration module to select a target relative coordinate corresponding to the target object, among the reference relative coordinates, and to calculate the estimated target height by performing a height estimating operation by referring to the initial estimated pitch, wherein the height estimating operation is performed by referring to a following formula:

$$H = \frac{(Z_2 - Z_1)}{Z_2}L, \text{ where } Z_2 = \frac{L}{\tan(\phi_2 + \theta)}, \phi_2 = \tan^{-1}\frac{y_2 - c_y}{f}$$

wherein $Z_1$ denotes a longitudinal floor distance of the target relative coordinate $(X_1, Z_1)$, $\theta$ denotes the initial estimated pitch, L denotes a height of the subject camera from the ground, $Z_2$ denotes a longitudinal projection distance, which is a component of a target height estimated point generated by mapping a target height estimation base point $(x_2, y_2)$, which is a point of an upper side of a target bounding box including the target object, onto a space coordinate system corresponding to a virtual space including the subject autonomous vehicle, and f denotes a focal length of the subject camera.

7. The method of claim 1, wherein, at the step of (b), the computing device, in case the number of the target object is 1, instructs the adjusting pitch calibration module (i) to set an overestimated range and an underestimated range by referring to the GT target height, and (ii-1) to adjust the initial estimated pitch to be decreased by a prescribed adjustment ratio if the estimated target height is included in the overestimated range, or (ii-2) to adjust the initial estimated pitch to be increased by the prescribed adjustment ratio if the estimated target height is included in the underestimated range.

8. The method of claim 1, wherein, at the step of (b), the computing device, in case the number of the target object is larger than or same as 2, instructs the adjusting pitch calibration module (i) to set an overestimated range and an underestimated range by referring to the GT target height, (ii) to acquire information on at least one of an overestimated error ratio corresponding to the overestimated range and an underestimated error ratio corresponding to the underestimated range, and (iii) adjust the initial estimated pitch by referring to said information.

9. The method of claim 1, wherein, at the step of (a), the computing device instructs the initial pitch calibration module to generate the initial estimated pitch by applying the pitch calculation operation to the reference image, wherein the pitch calculation operation is performed by referring to a following formula:

$$\theta_{pitch} = \tan^{-1}\left(\frac{v_y - c_y}{f_y}\right)$$

wherein $v_y$ denotes an y-direction coordinate of a vanishing point of the reference image, whose information has been acquired by finding a point where one or more lines of the reference image vanish, $c_y$ denotes an y-direction coordinate of a principal point of the reference image, and $f_y$ denotes an y-direction coordinate of a focal point of the reference image.

10. The method of claim 1, wherein, at the step of (a), the computing device (i) instructs a convolutional layer of the object detection network to generate at least one reference convolutional feature map by applying at least one convolutional operation, which is a part of the neural network operation, to the reference image, (ii) instructs an ROI pooling layer of the object detection network to apply at least one pooling operation, which is a part of the neural network operation, in order to pool values, corresponding to ROIs of the reference image, from the reference convolutional feature map, to thereby generate at least one reference ROI-Pooled feature map, and (iii) instructs an FC layer of the object detection network to apply at least one FC operation, which is a part of the neural network operation, to the reference ROI-Pooled feature map, to thereby generate the reference object detection information including information on reference classes of the reference objects and reference bounding boxes including the reference objects.

11. The method of claim 1, further comprising a step of:

(c) the computing device instructing the object detection network and the distance calculation module to generate autonomous driving information including information on distances, calculated by referring to the adjusted estimated pitch, between the subject autonomous vehicle and surrounding objects included in an autonomous driving image.

12. A computing device for enhancing an accuracy of object distance estimation based on at least one subject camera by performing pitch calibration of the subject camera more precisely with additional information acquired through Vehicle-to-Vehicle (V2V) communication, comprising:
at least one memory that stores instructions; and
at least one processor configured to execute the instructions to perform processes of: (I) if at least one reference image is acquired through the subject camera, performing (i) a process of instructing an initial pitch calibration module to apply at least one pitch calculation operation to the reference image, to thereby generate an initial estimated pitch, which is a value generated by estimating an angle between an optical axis of the subject camera and a ground, and (ii) a process of instructing an object detection network to apply at least one neural network operation to the reference image, to thereby generate reference object detection information on one or more reference objects in the reference image; (II) instructing an adjusting pitch calibration module to (i) select at least one target object among the reference objects, (ii) calculate at least one estimated target height of the target object by referring to the initial estimated pitch and at least one relative location of the target object from a subject autonomous vehicle including the subject camera, (iii) calculate at least one error corresponding to the initial estimated pitch by referring to the estimated target height and at least one Ground-Truth (GT) target height acquired beforehand, and (iv) determine at least one adjusted estimated pitch on the subject camera by using the error.

13. The device of claim 12, wherein the processor instructs the adjusting pitch calibration module to select one or more specific reference objects, among the reference objects, which satisfy a first condition on whether each of the reference objects has a specific class corresponding to a communicability or not, and to select said at least one target object, among the specific reference objects, which satisfies at least one of (i) a second condition on whether each of specific reference bounding boxes including each of the specific reference objects is located in at least one illustration window area of the reference image or not and (ii) a third condition on whether an aspect ratio of each of the specific reference bounding box is smaller than an estimation threshold value or not.

14. The device of claim 12, wherein, before the process of (II), the processor instructs a distance calculation module to map each of one or more reference location base points, which are points in each of lower sides of each of reference bounding boxes including each of the reference objects, onto a space coordinate system corresponding to a virtual space including the subject autonomous vehicle by referring to the initial estimated pitch, the reference object detection information, and the reference image, to thereby calculate one or more longitudinal floor distances and one or more lateral floor distances between the reference objects and the subject autonomous vehicle, and then to thereby generate each of reference relative coordinates including each of the longitudinal floor distances and the lateral floor distances as its components.

15. The device of claim 14, wherein, before the process of (II), the processor instructs the distance calculation module to map the reference location base points onto the space coordinate system by referring to a following formula:

$$(x_1, y_1) \to (X_1, Z_1), \text{ where } Z_1 = \frac{L}{\tan(\phi_1 + \theta)},$$
$$\phi_1 = \tan^{-1}\frac{y_1 - c_y}{f} \text{ and } X_1 = \frac{x - c_x}{f}Z_1$$

wherein $(x_1, y_1)$ denotes a coordinate of one of the reference location base points on the reference image, $(X_1, Z_1)$ denotes one of the reference relative coordinates corresponding to $(x_1, y_1)$ in the space coordinate system whose original point is set by using a location of the subject autonomous vehicle, $X_1$ denotes one of the lateral floor distances, $Z_1$ denotes one of the longitudinal floor distances, $\theta$ denotes the initial estimated pitch, $(c_x, c_y)$ denotes a coordinate of a principal point of the subject camera, L denotes a height of the subject camera from the ground, and f denotes a focal length of the subject camera.

16. The device of claim 14, wherein, before the process of (II), the processor instructs a V2V communication module to communicate with one or more communicable objects located closer than a threshold distance from the subject autonomous vehicle, to thereby acquire information on one or more communicable object classes, one or more communicable object GT heights, and one or more communicable object coordinates, and instructs the adjusting pitch calibration module to select specific reference objects, among the reference objects, which have a specific class corresponding to a communicability, and pair at least part of the communicable object GT heights with at least part of the specific reference objects by referring to (i) communicable object relative coordinates in relation to the subject autonomous vehicle, calculated by using the communicable object coordinates and (ii) specific reference relative coordinates on the specific reference objects, to thereby acquire specific reference GT heights on the specific reference objects.

17. The device of claim 12, wherein, at the process of (II), the processor, if the target object is selected, instructs the adjusting pitch calibration module to select a target relative coordinate corresponding to the target object, among the reference relative coordinates, and to calculate the estimated target height by performing a height estimating operation by referring to the initial estimated pitch, wherein the height estimating operation is performed by referring to a following formula:

$$H = \frac{(Z_2 - Z_1)}{Z_2}L, \text{ where } Z_2 = \frac{L}{\tan(\phi_2 + \theta)}, \phi_2 = \tan^{-1}\frac{y_2 - c_y}{f}$$

wherein $Z_1$ denotes a longitudinal floor distance of the target relative coordinate $(X_1, Z_1)$, $\theta$ denotes the initial estimated pitch, L denotes a height of the subject camera from the ground, $Z_2$ denotes a longitudinal projection distance, which is a component of a target height estimated point generated by mapping a target height estimation base point $(x_2, y_2)$, which is a point of an upper side of a target bounding box including the target object, onto a space coordinate system corresponding to a virtual space including the subject autonomous vehicle, and f denotes a focal length of the subject camera.

18. The device of claim 12, wherein, at the process of (II), the processor, in case the number of the target object is 1, instructs the adjusting pitch calibration module (i) to set an overestimated range and an underestimated range by referring to the GT target height, and (ii-1) to adjust the initial estimated pitch to be decreased by a prescribed adjustment ratio if the estimated target height is included in the overestimated range, or (ii-2) to adjust the initial estimated pitch to be increased by the prescribed adjustment ratio if the estimated target height is included in the underestimated range.

19. The device of claim 12, wherein, at the process of (II), the processor, in case the number of the target object is larger than or same as 2, instructs the adjusting pitch calibration module (i) to set an overestimated range and an underestimated range by referring to the GT target height, (ii) to acquire information on at least one of an overestimated error ratio corresponding to the overestimated range and an underestimated error ratio corresponding to the underestimated range, and (iii) adjust the initial estimated pitch by referring to said information.

20. The device of claim 12, wherein, at the process of (I), the processor instructs the initial pitch calibration module to generate the initial estimated pitch by applying the pitch calculation operation to the reference image, wherein the pitch calculation operation is performed by referring to a following formula:

$$\theta_{pitch} = \tan^{-1}\left(\frac{v_y - c_y}{f_y}\right)$$

wherein $v_y$ denotes an y-direction coordinate of a vanishing point of the reference image, whose information has been acquired by finding a point where one or more lines of the reference image vanish, $c_y$ denotes an y-direction coordinate of a principal point of the reference image, and $f_y$ denotes an y-direction coordinate of a focal point of the reference image.

21. The device of claim 12, wherein, at the process of (I), the processor (i) instructs a convolutional layer of the object detection network to generate at least one reference convolutional feature map by applying at least one convolutional operation, which is a part of the neural network operation, to the reference image, (ii) instructs an ROI pooling layer of the object detection network to apply at least one pooling operation, which is a part of the neural network operation, in order to pool values, corresponding to ROIs of the reference image, from the reference convolutional feature map, to thereby generate at least one reference ROI-Pooled feature map, and (iii) instructs an FC layer of the object detection network to apply at least one FC operation, which is a part of the neural network operation, to the reference ROI-Pooled feature map, to thereby generate the reference object detection information including information on reference classes of the reference objects and reference bounding boxes including the reference objects.

22. The device of claim 12, wherein the processor further performs a process of:
(III) instructing the object detection network and the distance calculation module to generate autonomous driving information including information on distances, calculated by referring to the adjusted estimated pitch, between the subject autonomous vehicle and surrounding objects included in an autonomous driving image.

* * * * *